United States Patent
Horesh et al.

(10) Patent No.: US 11,934,439 B1
(45) Date of Patent: Mar. 19, 2024

(54) SIMILAR CASES RETRIEVAL IN REAL TIME FOR CALL CENTER AGENTS

(71) Applicant: Intuit Inc., Mountain View, CA (US)

(72) Inventors: Yair Horesh, Kfar Sava (IL); Yehezkel Shraga Resheff, Jerusalem (IL); Shlomi Medalion, Lod (IL); Liron Hayman, Hod HaSharon (IL)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 18/114,943

(22) Filed: Feb. 27, 2023

(51) Int. Cl.
| | |
|---|---|
| *G06F 16/00* | (2019.01) |
| *G06F 16/31* | (2019.01) |
| *G06F 16/35* | (2019.01) |
| *G06F 40/205* | (2020.01) |

(52) U.S. Cl.
CPC ............ *G06F 16/358* (2019.01); *G06F 16/31* (2019.01); *G06F 40/205* (2020.01)

(58) Field of Classification Search
CPC ....... G06F 40/205; G06F 16/358; G06F 16/31
See application file for complete search history.

(56) References Cited

U.S. PATENT DOCUMENTS

| | | | | |
|---|---|---|---|---|
| 11,538,481 | B2* | 12/2022 | Li ............................ | G10L 25/30 |
| 2010/0324901 | A1* | 12/2010 | Carter .................... | G10L 15/065 |
| | | | | 704/255 |
| 2018/0225710 | A1* | 8/2018 | Kar ..................... | G06Q 30/0254 |
| 2019/0370554 | A1* | 12/2019 | Meier ................... | G11B 27/031 |
| 2020/0037022 | A1* | 1/2020 | Stojancic ................ | G06F 3/165 |
| 2020/0302018 | A1* | 9/2020 | Turkkan ................ | G06F 40/284 |
| 2021/0158234 | A1* | 5/2021 | Sivasubramanian ... | G10L 15/26 |
| 2021/0390264 | A1* | 12/2021 | Sathaye .................. | G06F 40/30 |
| 2022/0293107 | A1* | 9/2022 | Leaman ................ | G06F 16/951 |
| 2022/0335947 | A1* | 10/2022 | Li ............................ | G10L 15/26 |
| 2023/0098063 | A1* | 3/2023 | Li ............................ | G10L 25/30 |
| | | | | 704/200 |

FOREIGN PATENT DOCUMENTS

| | | | | | |
|---|---|---|---|---|---|
| CA | 2924065 | C | * | 5/2018 | ......... G06K 9/00711 |
| CN | 1270361 | A | * | 10/2000 | .......... G06F 16/685 |
| CN | 110210557 | A | * | 9/2019 | |
| WO | WO-2018197639 | A1 | * | 11/2018 | ............. G06F 16/00 |

* cited by examiner

*Primary Examiner* — Leslie Wong
(74) *Attorney, Agent, or Firm* — Lathrop GPM (57) ABSTRACT

Methods, computer systems and computer program product are provided for retrieving contextually relevant documents in near real time. When text data it's received from an application, the text data is processed through a text segmentation model to generate a set of documents. Each document corresponds to a segment of the text data. A first vector representation is generated for a first document of the set of documents. A machine learning process compares the first vector representation and a set of vector representations for a set of documents within a data repository to determine a subset of the documents. A composite rank is generated for each respective document of the subset. The subset of documents is then presented through an interface, sorted according to the respective composite ranks.

18 Claims, 5 Drawing Sheets

SIMILAR CASES RETRIEVAL IN REAL TIME FOR CALL CENTER AGENTS

BACKGROUND

Good customer support is top priority for many companies. While communication between customers and service providers frequently takes place online, there remains an ongoing need for voice communications between an agent of the service provider and a customer. An agent typically is a member of a service provider's call center, in which the task of the agent is to make or answer telephone calls. A call center agent may have the responsibility to take customer service calls from users of a service provider's data management system, to provide technical support for problems related to a data management system, and various other agent responsibilities.

Such calls between agents and customers are often recorded. Such call recordings are typically used for quality control purposes and may be referenced to help solve future customer issues. Customer situations are usually one or more sentences long. Since the breadth of situations customers face is somewhat limited, the majority of customer situations tend to repeat. The success rate for response approaches are documented in the system. However, successful resolutions to customer issues are often inaccessible to the agent in real time, or difficult to analyze.

SUMMARY

In general, one or more aspects of the disclosure relates to a method. The method includes receiving text data from an application. The method also includes processing the text data through the text segmentation model to generate a set of documents, wherein each document corresponds to a segment of the text data. The method further includes generating a first vector representation for a first document of the set of documents the method additionally includes performing a machine learning process that compares the first vector representation and a set of vector representations for a set of documents within a data repository to determine a subset of the documents. The method further includes generating a composite rank for each respective document of the subset. The method additionally includes presenting the subset of documents, sorted according to the respective composite ranks.

In general, one or more aspects of the disclosure relates to a system comprising a computer processor, a text segmentation model, and a recommendation model. The text segmentation model, executing on the computer processor, is configured for: receiving text data from an application; and processing the text data through the text segmentation model to generate a set of documents. Each document corresponds to a segment of the text data. The recommendation model, executing on the computer processor, is configured for: receiving the set of documents from the text segmentation model; processing the set of documents through the recommendation model to generate a first vector representation for a first document of the set of documents; processing the first vector representation through the recommendation model to compare the first vector representation with a set of vector representations for a set of documents stored within a data repository; and processing the set of vector representations through the recommendation model to determine a subset of the set of documents. The system is further configured for: generating a respective composite rank for each document of the subset; and presenting the subset in an interface, sorted according to the respective composite ranks.

In general, one or more aspects of the disclosure relates to a computer program product comprising non-transitory computer-readable program code. When executed by a computer processor of a computing system, the program code causes computing system to perform operations. The operations include receiving text data from an application. The operations further include processing the text data through the text segmentation model to generate a set of documents. Each document corresponds to a segment of the text data. The operations additionally include generating a first vector representation for a first document of the set of documents. The operations further include performing a machine learning process that compares the first vector representation and a set of vector representations for a set of documents within a data repository to determine a subset of the documents. The operations also include generating a composite rank for each respective document of the subset. The operations further include presenting the subset of documents, sorted according to the respective composite ranks.

Other aspects of the invention will be apparent from the following description and the appended claims.

BRIEF DESCRIPTION OF DRAWINGS

Like elements in the various figures are denoted by like reference numerals for consistency.

DETAILED DESCRIPTION

In general, the system is composed of a combination of components that leverages multiple technologies, including real-time speech-to-text, Information Retrieval, text segmentation, recombination systems. The system identifies and retrieves documents that are contextually relevant to real time communications over a streaming data channel.

In the context of helping agents at call centers, embodiments are directed to a system that transcribes agent—customer calls in near to real time and queries the recent key-sentences in a database of transcribed calls. The process links the call to recent activity to find a faster and better way to get the caller the answers they are looking for. The agent will be popped with the retrieved calls with high score (above a threshold) and will be able to send feedback was a call helpful.

Component 1: Near Real-Time Speech-to-Text the system provides for real-time transcriptions of media content. Unlike batch transcriptions, the current system provides speech to text transcription in real time. Because streaming works in real time, transcripts are produced in partial results. The streaming content is delivered as a series of sequential data packets, enabling real-time speech-to-text capabilities.

If resources are short, for example during rush hours that demand significant computational resource, the system can be configured to: (1) work only when activated by the agent on the recent 30 seconds of recording, (2) stop real-time mode after the first minute of the call, (3) stop after the first offer is made, (4) serve only new agents, or any other restriction.

Component 2: Information Retrieval

An entire service call is often lengthy, spanning multiple topics text. Using one or more machine learning processes, the current system breaks the call into segments These segments, when in length of few sentences, are of the right granularity to be indexed as documents. The Text Segmentation process also provides a good filtering point for irrelevant documents. For example, call ending, and spin-off can be filtered out by using key words and/or starting time and duration within the call. Indexed documents can then be retrieved via an API using known document retrieval systems, such as Elasticsearch.

Component 3: Ranking System

The results are ranked by the combination of three (weighted) factors—(1) the 'standard' Information Retrieval generated by the search/indexing system, (2) by customer feedback score to this call, and by (3) how relevant was this call for the agent. The document ranking function may provide a score that is normalized to 0 . . . 1):

Combined Score=$f$(Information Retrieval, customer score, agent score).

For example, one possible function may be addition, where each component of the score may by weighted according to business needs. If the document wasn't presented to the agent, the agent score is set to 1 (and run over by the first score it gets if presented).

More complex scoring systems can be used—for example, a decision tree like structure (e.g., if agent score >0.5 and . . . ) can be used, with the three scores, and/or with other features such as phrase matching. These kind of models with multiple features can hand curated or built automatically by a machine learning framework where agent score is a target variable.

Component 4: User Interface and Feedback

An agent-facing user interface is populated with the suggested segment. The interface provides the agent with the ability to move forward and backwards to the next or the previous segment of the transcription. When the call ends, the agent can provide user feedback, such as a rating from 0 to 5 stars, and to optionally leave a comment. Moreover, the agent may have the option to offer its call as a suggested solution. Once feedback is received, the information retrieval system is updated with the new data (e.g., user scores are updated).

Component 5: Live Recommendation

At the conclusion of a segment, or at a predefined time interval (e.g., every 10 seconds) the recommendation system queries the Information retrieval system for relevant document. If the combined score for an identified document is above a predefined threshold, the document is presented to the agent with links to next/previous segments of the service call.

Figure 1:
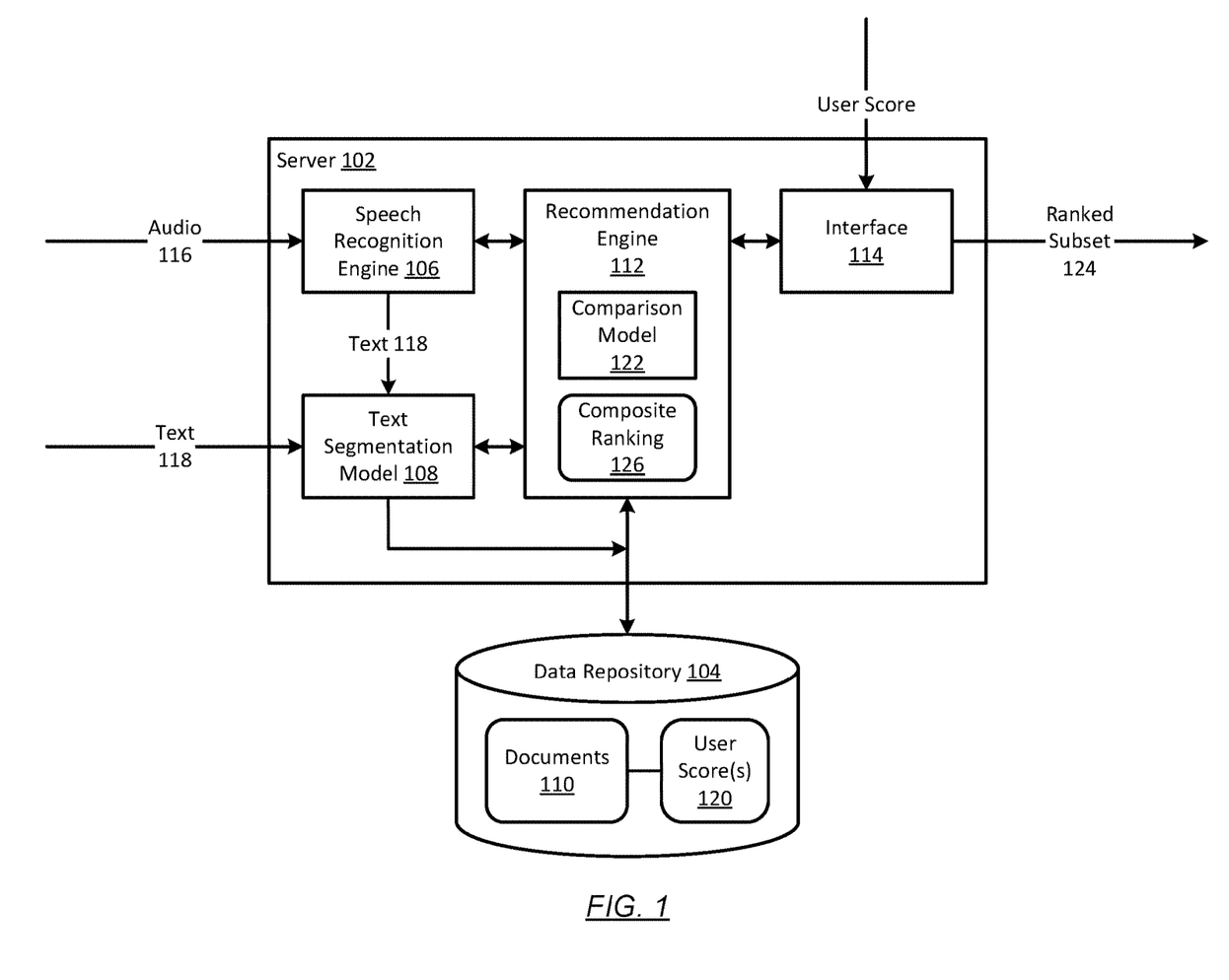
FIG. 1 illustrates an example data processing environment ("environment") in accordance with the disclosed embodiments.

Turning now to the figures, FIG. 1 illustrates an example data processing environment ("environment") in accordance with the disclosed embodiments. In some embodiments, the environment (100) can a server (102) communicatively connected to a data repository (104) by way of a network. One or more client devices (not shown) may be used or otherwise accessed by one or more users to access applications executing on the server (102).

Figure 5A:
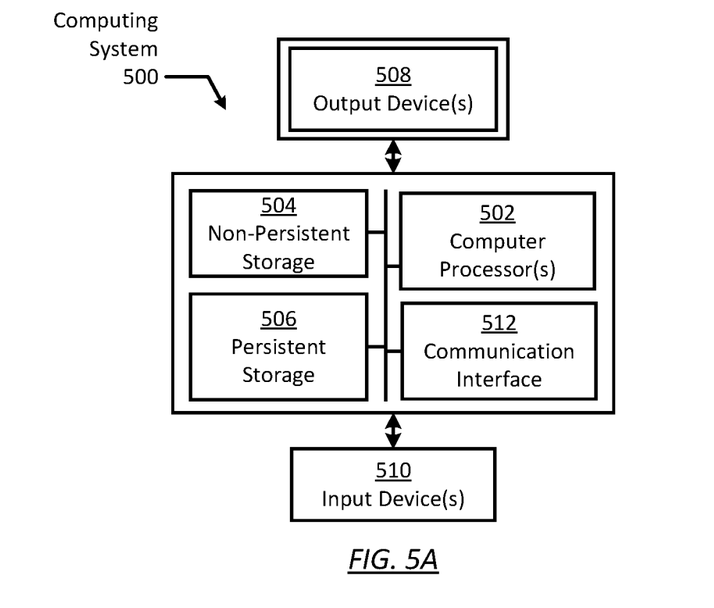
FIGS. 5A and 5B show a computing system in accordance with one or more embodiments of the invention.

The server (102) is a computing system (further described in FIG. 5A). The server (102) may include multiple physical and virtual computing systems that form part of a cloud computing environment. In one embodiment, execution of the instructions, programs, and applications of the server (102) is distributed to multiple structured documents (hypertext markup language (HTML) pages, extensible markup language (XML) pages, JavaScript object notation (JSON) files and messages, etc.) to interact with user devices connected via a network. As illustrated, the server (102) includes the speech recognition engine (106), text segmentation model (108), recommendation engine (112), and interface (114).

The server (102) may connect to a data repository (104). In one or more embodiments of the invention, the data repository (104) is any type of storage unit and/or device (e.g., a file system, database, data structure, or any other storage mechanism) for storing data. Further, the data repository (104) may include multiple different, potentially heterogeneous, storage units and/or devices. The data repository (104) stores documents (110) and user scores (120).

Speech recognition engine (106) is a collection of programs with instructions that may execute on multiple servers of a cloud environment, including the server (102). The speech recognition engine (106) may be configured to process audio (116) to generate text (118). For example, speech recognition engine (106) may apply one or more natural language to input received from one or more user devices (not shown) to generate a text (118) transcription of audio (116).

The audio (116) may be real-time audio communications among two or more channels. For example, the audio (116) may be an analog, or a digital signal received over a communication channel. The communication may be between a customer channel and a call center agent channel. As another example, a channel may be an automated communication source such as a speech synthesizer. As another example, the channel may correspond to a party to a conference call. The text (118) may be a textual transcription record of communications among two or more channels.

The audio (116) may be provided as a data stream received via an application programming interface (API). As opposed to batched data, which is processed and analyzed in chunks, a "data stream" refers to a continuous flow of streaming data that is generated and/or transmitted in real-time or near-real-time. The audio (116) can be encoded in any format appropriate for data streaming, such as MP3, AAC, Vorbis, Opis, etc. The audio (116) can be transmitted to speech recognition engine (106) over a network via an appropriate transport protocol, such as real time transport protocol (RTP) and/or real time streaming protocol (RTSP).

Continuing with FIG. 1, the speech recognition engine (106) is a distinct program that is configured to perform natural language processing, including speech to text generation, on the input audio (116). Namely, the speech recognition engine may have underlying algorithms that perform natural language processing. For example, speech recognition engines may have a convolutional neural network, with different nodes, layers, and weights. The underlying algorithms may be unknown to the system, being offered as a commercial engine that follows a SAAS model or as a plugin to another component of the system. The speech recognition engine may be configured to receive a request with the input audio (116) and respond with the text (118) transcription of audio (116).

In some embodiments, execution of the speech recognition engine (106) is performed by initiating a request to a third-party speech recognition engine, such as by using an application programming interface (API) of the speech recognition engine. The speech recognition engine (106) may execute locally or remotely. As such, speech recognition processing may be a local processing, or the request may be transmitted to a remote endpoint. Execution of the speech recognition engine may be triggered by sending a request to the speech recognition engine. In some embodiments, the application programming interface (API) is configured to call one or more external speech recognition services for generating text (118) transcript of audio (116).

The text segmentation model (108) is a machine learning model for segmenting text (118) into documents (110). Text segmentation is the task of dividing text into segments, such that each segment is topically coherent, and cutoff points indicate a change of topic. These segments, when in length of few sentences, have a granularity that is ideal to be indexed as documents (110). This segmentation and indexing provides basic structure to text (118) in a way that documents (110) can later be used by downstream applications such as comparison, summarization and/or information extraction.

In some embodiments, the documents (110) may be stored as an ordered sequence. For example, a series of time sequential documents may be linked together as an array, linked list, doubly linked list, etc., enabling a user to easily ability to navigate forward and backwards to a next or previous temporal segment of the audio (116).

Different types of machine learning models may be used as the text segmentation model (108) to segment text (118) into documents (110). For example, the text segmentation model (108) can be based on Bayesian text segmentation methods that employ a generative probabilistic model for text. In these models, a document is represented as a set of topics, which are sampled from a topic distribution, and each topic imposes a distribution over the vocabulary. Generative probabilistic models may define a coherence score between pairs of sentences. Segmentation is computed by finding drops in coherence scores between pairs of adjacent sentences.

In another example, the text segmentation model (108) may utilize an unsupervised graph-based method that represents sentences as nodes. An edge between two sentences signifies that the sentences are semantically similar Segmentation is then determined by finding maximal cliques of adjacent sentences, and heuristically completing the segmentation.

In another example, the text segmentation model (108) can be neural model is composed of a hierarchy of sub-networks. A lower-level bidirectional long short-term memory (LSTM) creates sentence representations from word tokens. A higher-level LSTM consumes the sentence representations, labeling each sentence.

The recommendation engine (112) includes a comparison model (122).). The comparison model (122) is a machine learning model trained using pairs of documents (110), as described below. The comparison model (122) includes functionality to calculate similarity scores for pairs of documents (110). The comparison model (122) may also calculate a similarity score for a segment of text (118) and one or more documents (110 in one or more embodiments, the comparison model (152) may be a Siamese network model.

A recommendation engine (112) may be used for generating recommendations in real time. For example, the comparison model (122) may be used during an entity session to compare documents segments of text (118) to documents (110) generated in one or more previous transactions. The comparison model (122) may then determine the similarity between the compared documents. Documents (110) of the prior transactions that have a high enough comparison score (i.e., the score meets a threshold value), are forwarded to the interface (114), where they can be presented to a user or consuming application.

As described above, the text segmentation model (108) and comparison model (122) are machine learning models, and may be the same type of model or different types of models. Different types of machine learning models may be used. For example, a decision tree model operates by performing a sequence of tests at each node through a path of a decision tree from the root to a leaf node. The result of each test leads to a next node in the path until the leaf node is reached that identifies the category. The decision tree learns the tests and the order of the tests to identify the correct category.

By way of another example, an XGBoost model may be used. XGBoost is a decision tree-based ensemble machine learning model that uses a gradient boosting framework.

Another machine learning model that may be used is a recurrent neural network. The recurrent neural network model is a classifier model that has multiple layers of nodes. The recurrent neural network learns the weights to apply through layers of nodes through executing a loss function and back propagation. The output of the recurrent neural network is the probability that the node is in each category.

By way of another example, a Siamese neural network model may be used. The Siamese neural network model has separate encoder models to separately encode category information for each category and the transaction records to obtain a category intermediate vector for each category, and a transaction intermediate vector. A decoder model decodes the category intermediate vectors and the transaction intermediate vector to obtain decoder output for the transaction and categories. A selector selects, for a transaction decoder output, the category having the category decoder output that is the closest match to the transaction decoder output.

The above are only a brief description of some of the machine learning models that may be used as the text segmentation model (108) and comparison model (122). Other types of machine learning models may be used without departing from the scope of the invention.

The interface (114) may be a graphical user interface (GUI) or application programming interface (API), depending on the implementation. Interface (114) presents relevant documents as a ranked subset (124) according to their composite ranking (126). The composite ranking (126) may be based on a combination of user scores (120) and model scores generated by the comparison model (122) for particular documents.

For example, recommendation engine (112) may apply one or more scoring algorithms to determine each document's relevance to the search request. For example, recommendation engine (112) may employ a search service, such as an Apache Lucene scoring method and/or a modified version thereof, to generate model scores.

User scores (120) are feedback received from users about documents (110). For example, a user may be provided with a questionnaire regarding related to a user satisfaction or relevance of the Documents (110) presented in the ranked subset (124). The feedback may be based on a simple up vote (e.g., be of high quality)/down vote (e.g., be of low-quality), or may consider comments and/or answers submitted by users regarding the presented documents. The feedback can be vectorized to determine a numeric and/or vector value, which is then combined with the model scores in order to generate the composite ranking (126).

Figure 2:
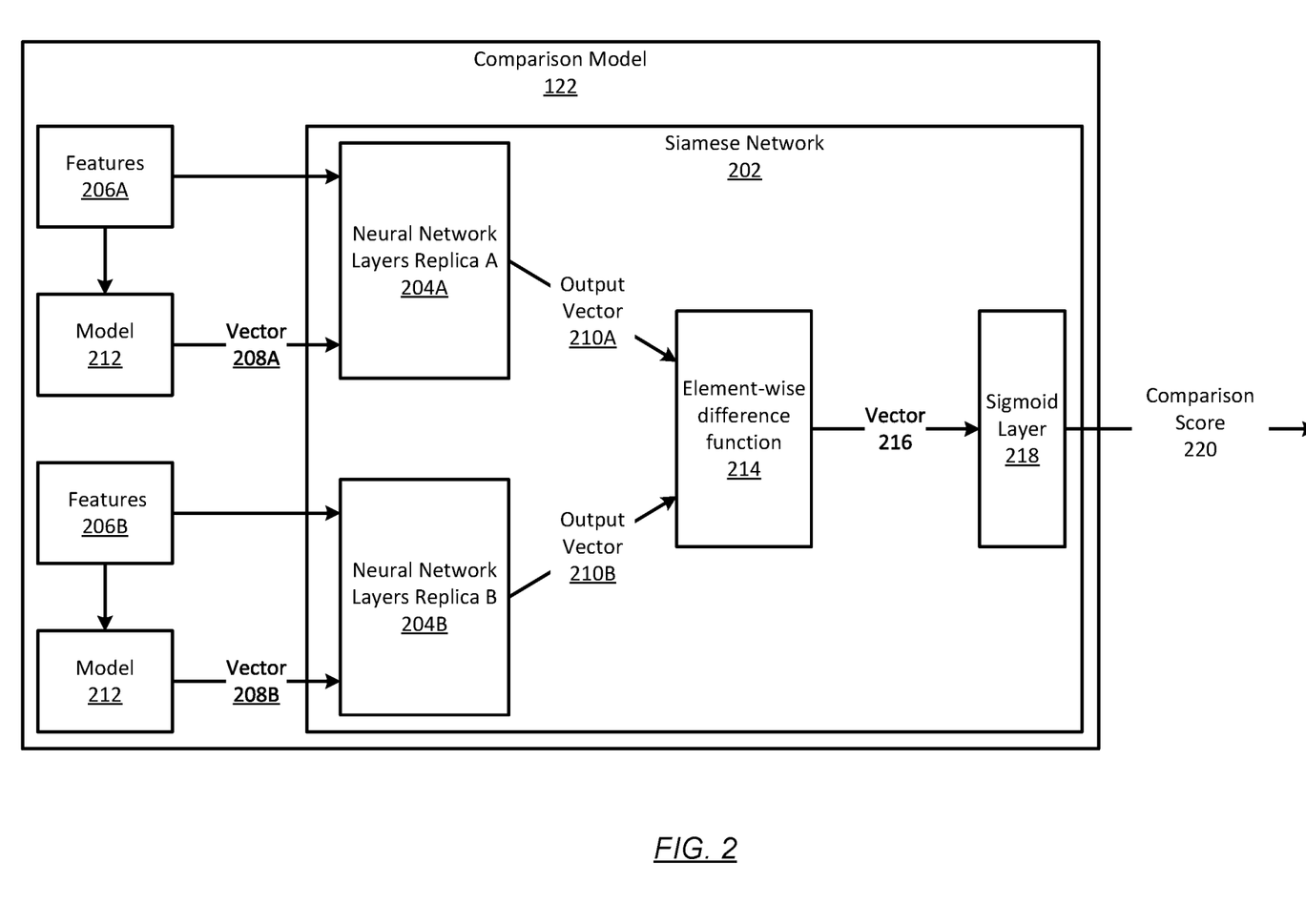
FIG. 2 illustrates a comparison model in accordance with the disclosed embodiments.

Turning to FIG. 2, in one or more embodiments, the comparison model implemented in recommendation engine (112) includes a Siamese network (202). A Siamese network includes two identical replicas of neural network layers with the same structure and the same weights. One or more layers in the replicas of neural network layers are fully connected layers. A Siamese network is trained to learn a similarity function that compares inputs without classifying the inputs. Siamese networks are often applied in "few-shot learning" scenarios, where training is based on only a few samples, and an efficient (e.g., real time) comparison of a pair of input vectors is desired.

The Siamese network (202) includes neural network layers replicas (204A, 204B) that include functionality to process features (206A, 206B) and/or vectors (208A, 208B) in parallel to compute output vectors (210A, 210B). The vectors (208A, 208B) are generated using a transaction model (212) that embeds features (206A, 206B) of a pair of documents, or a document-segment pair, in a latent vector space in which similar transaction features are embedded in close proximity and dissimilar transaction features are embedded far apart.

The Siamese network (202) includes functionality (214) to calculate the element-wise absolute difference vector (216) between the output vectors (210A, 210B). The Siamese network includes functionality to apply a sigmoid layer (218) to the absolute difference vector (216) to generate a comparison score (220). The comparison score (220) quantifies the similarity between the pair of documents, or a document-segment pair, from which the features (206A, 206B) and the vectors (208A, 208B) were generated. According to the construction of the sigmoidal layer, the comparison score (220) is a normalized value between zero and one.

In one or more embodiments, vectors (208A, 208B) are a combination (e.g., a concatenation) of one or more vectors generated from features (206A, 206B). The vectors (208A, 208B) may be a vector (e.g., a point) in a multi-dimensional latent vector space.

While FIG. 1 and FIG. 2 show a configuration of components, other configurations may be used without departing from the scope of the invention. For example, various components may be combined to create a single component. As another example, the functionality performed by a single component may be performed by two or more components.

Figure 3:
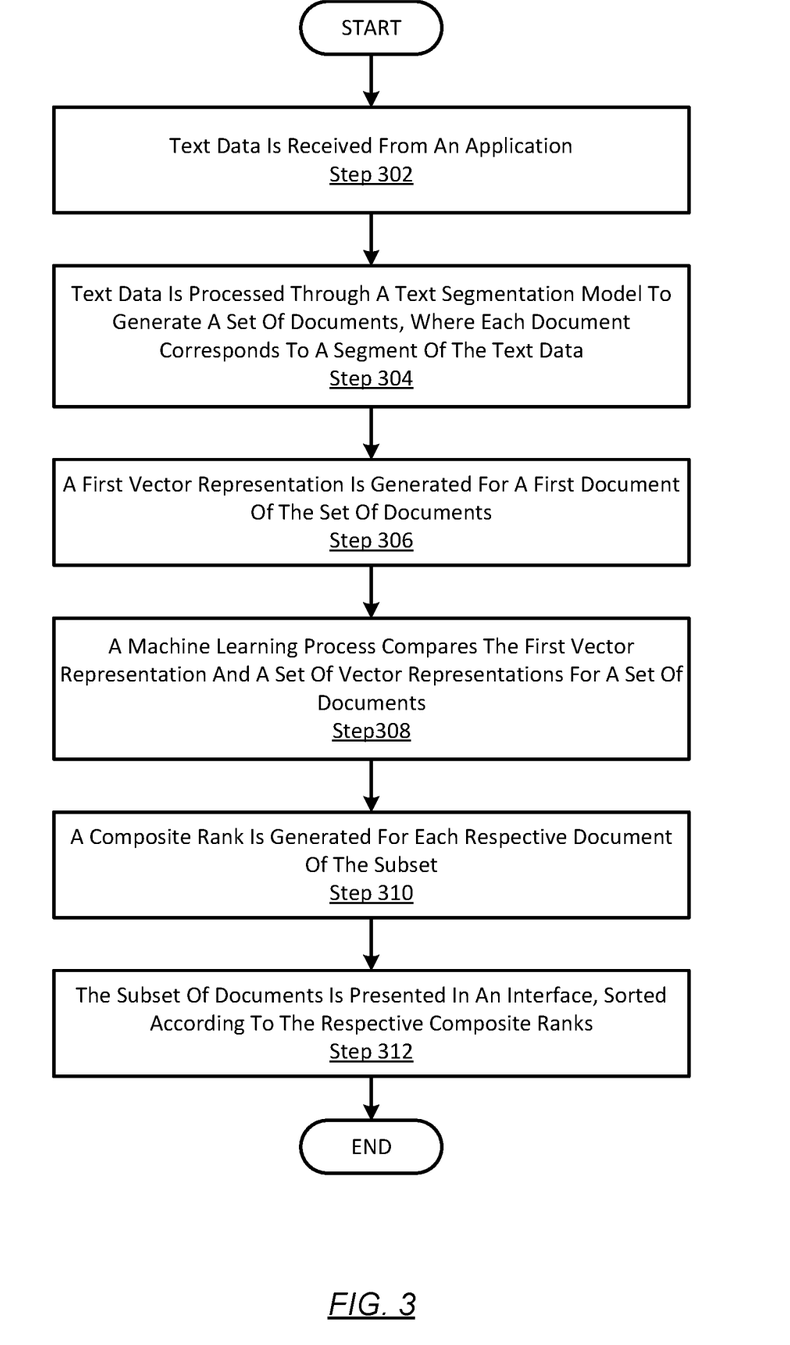
FIG. 3 illustrates a process for processing a data stream to identify and retrieve contextually relevant documents according to one or more illustrative embodiments.

Referring now to FIG. 3, a process for processing a data stream to identify and retrieve contextually relevant documents is shown according to one or more illustrative embodiments. The process of FIG. 3 takes advantage of one or more machine learning processes, such as speech recognition, text segmentation, and document comparison. The process of FIG. 3 may be performed by a computing device interacting with one or more additional computing devices. For example, the process of FIG. 3 may execute using one or more programs running on a server, such a server (102) of FIG. 1.

While the various steps in this flowchart are presented and described sequentially, at least some of the steps may be executed in different orders, may be combined, or omitted, and at least some of the steps may be executed in parallel. Furthermore, the steps may be performed actively or passively.

At step 302, text data is received from an application. For example, a speech recognition engine may perform natural language processing on an incoming stream of audio data, including speech to text generation, to generate the text data in near real time. As another example, the text data may be received via an API operatively connected to a data repository storing previously generated text.

At step 304, the text data is processed through a text segmentation model to generate a set of documents. Each document corresponds to a segment of the text data. Segmentation of the text data produces a set of documents having a granularity that may be beneficial to processing by downstream applications.

In one or more embodiments, the set of documents are indexed and stored in a data repository. In some embodiments, the documents may be stored as an ordered sequence. For example, a series of time sequential documents may be linked together as an array, linked list, doubly linked list, etc.

At step 306, generating a first vector representation for a first document of the set of documents. For example, the document may be processed by a machine learning model, such as a neural network, to generate vectors that embeds features of the document in a latent vector space in which similar transaction features are embedded in close proximity and dissimilar transaction features are embedded far apart.

At step 308, a machine learning process compares the first vector representation and a set of vector representations for a set of documents within a data repository to determine a subset of the documents. The subset consists of previously generated documents that are similar to first document. For example, the subset can be identified based on a vector comparison, such as a cosine similarity. The comparison may indicate a model confidence for classification of the first document. In one or more embodiments, the subset of documents can be determined by generating the first vector representation and the set of vector representations in parallel using a Siamese neural network.

At step 310, a composite rank is generated for each respective document of the subset. The composite ranking may be based on a combination of model scores generated by the machine learning models and user scores providing subjective feedback about particular documents.

For example, in one or more embodiments, the subset of documents is determining by generating a model confidence for each document in the subset. The composite rank for each document is then generated by combining a respective model confidence with a set of user scores for the respective document. User scores can be updated with additional feedback and/or scores received from a user, increasing the likelihood that identified documents are contextually relevant.

In one or more embodiments, the text segmentation, subset determination, and composite rank generation is performed over a first time-window of the data stream. For example, text data received in the first time window is processed to segment the text, determinate subset of relevant documents, and generate a composite rank for the identified subset. As additional data is received, such as in a second time window of the data stream, that data is processed to segment the text, determine a second subset of documents, and generate a composite rank for the second subset.

At step 312, the subset of documents presented, for example to an interface, sorted according to the respective composite ranks. As additional data is received and processed in real time, different subsets of document may be identified, which are then presented, sorted according to their respective composite ranks. In this manner, the interface continuously updated, thereby providing documents that are contextually relevant to topics that are identified within the incoming audio or text data.

Figure 4:
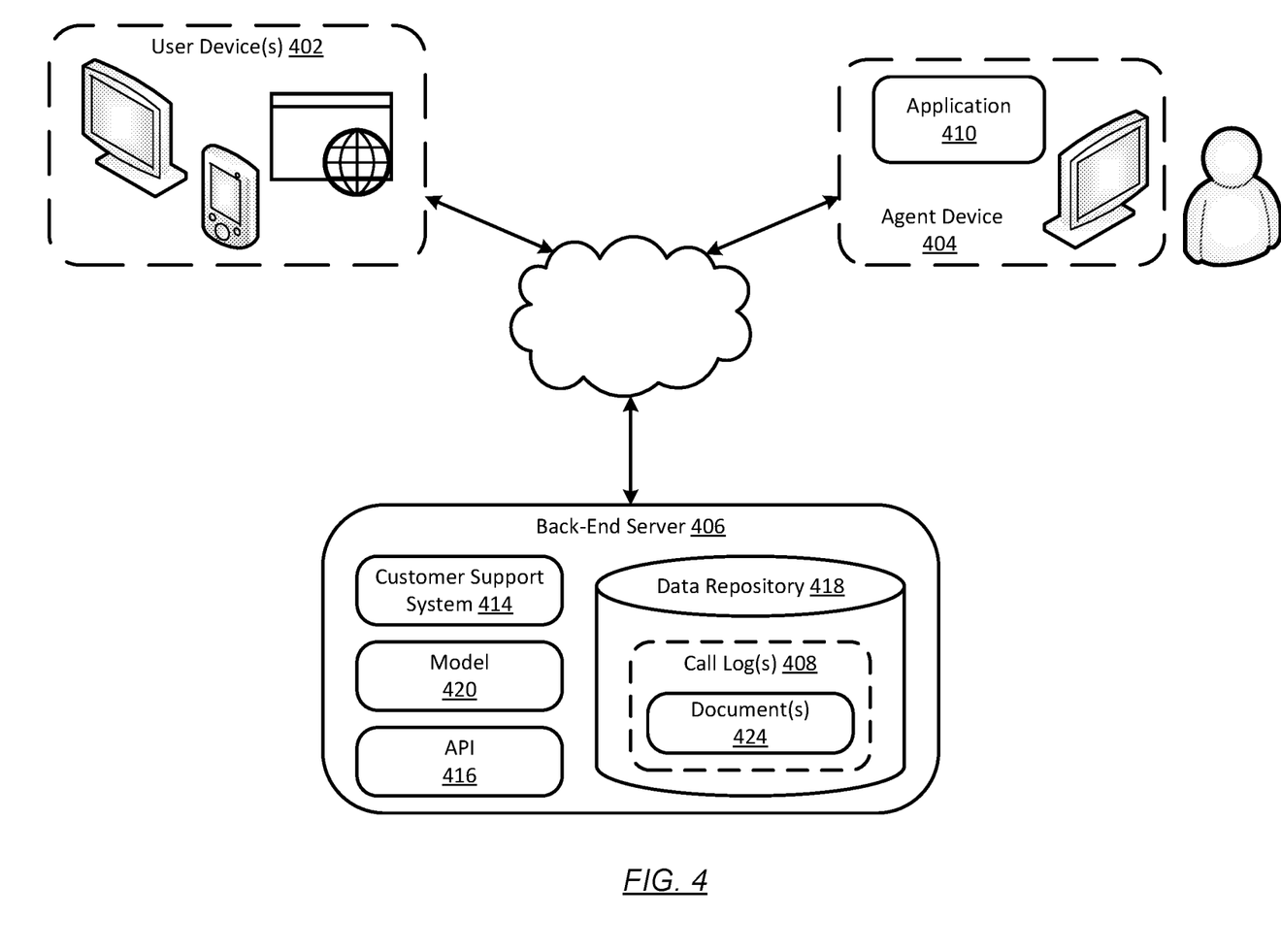
FIG. 4 is a flow diagram of an example of automatically identifying and presenting documents for a target customer call to a customer agent according to illustrative embodiments.

FIG. 4 is a flow diagram illustrating an example of automatically identifying and presenting documents for a target customer call to a customer agent, according to illustrative embodiments. The following example is for explanatory purposes only and not intended to limit the scope of the invention.

The back-end server (406) identifies an incoming voice call from user device (402). For example, agent device (404) may receive an incoming voice call from user device (402). Via application (410) executing on agent device (404), back-end server (406) may be notified that a dialogue has been established between user device (402) and agent device (404). In response to the notification, back-end server (406) may begin recording the conversation between a user of user device (402) and an agent of agent device (404).

The back-end server (406) automatically transcribes the incoming voice call, for example using a using speech recognition engine (106) of FIG. 1 to create a call log (408). In some embodiments, the speech recognition engine may automatically transcribe the incoming voice call using one or more natural language processing techniques. In some embodiments, API (416) may leverage a third-party service to automatically transcribe the incoming call. For example, API (416) may call an external service to transcribe the incoming call.

As the transcription is generated, back-end server (406) segments the transcription text into a sequence of documents (424). For example, one or more machine learning processes may apply one or more algorithms to may segment text into a sequence of topically coherent documents. These individual documents can then be linked as an array, linked list, doubly linked list, etc., and stored for further processing.

The back-end server (406) generates a vector from the segmented document. For example, one or more machine learning models (420), which can be an example of comparison model (122) of FIG. 1, may ingest the document and encode the document to generate the vector representation.

The back-end server (406) identifies a pre-existing situation vector that closely matches the estimated situation vector. To identify the pre-existing situation vector, customer support system (414) may utilize machine learning model to compare one or more pre-existing situation vectors stored in data repository (418) to the estimated situation vector. In some embodiments, the comparison may use a Siamese neural network to determine a cosine similarity between each stored situation vector and the estimated situation vector.

The back-end server (406) identifies pre-existing situation vector with the high cosine similarity score, such as defined by a threshold similarity score. Back-end server (406) generates a composite score for each identify document. The documents can then be presented to the user through an interface, ranked according to the composite score.

In this illustrative example, customer support system (414) is an example of recommendation engine (112) of FIG. 1. Customer support system (414) may use a list of the ranked documents to identify previously successful solutions to problems that are contextually similar to customer issues identified in real-time for the incoming call. In this manner, the system may assist the agent in resolving customer issues more quickly and easily by identifying similar solutions and recommending those solutions to the agent in typically coherent documents.

Embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 5A, the computing system (500) may include one or more computer processors (502), non-persistent storage (504), persistent storage (506), a communication interface (512) (e.g., Bluetooth interface, infrared interface, network interface, optical interface, etc.), and numerous other elements and functionalities that implement the features and elements of the disclosure. The computer processor(s) (502) may be an integrated circuit for processing instructions. The computer processor(s) may be one or more cores or micro-cores of a processor. The computer processor(s) (502) includes one or more processors. The one or more processors may include a central processing unit (CPU), a graphics processing unit (GPU), a tensor processing unit (TPU), combinations thereof, etc.

The input devices (510) may include a touchscreen, keyboard, mouse, microphone, touchpad, electronic pen, or any other type of input device. The input devices (510) may receive inputs from a user that are responsive to data and messages presented by the output devices (508). The inputs may include text input, audio input, video input, etc., which may be processed and transmitted by the computing system (500) in accordance with the disclosure. The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the output devices (508) may include a display device, a printer, external storage, or any other output device. One or more of the output devices may be the same or different from the input device(s). The input and output device(s) may be locally or remotely connected to the computer processor(s) (502). Many different types of computing systems exist, and the aforementioned input and output device(s) may take other forms. The output devices (508) may display data and messages that are transmitted and received by the computing system (500). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention, which may include transmitting, receiving, presenting, and displaying data and messages described in the other figures of the disclosure.

Figure 5B:
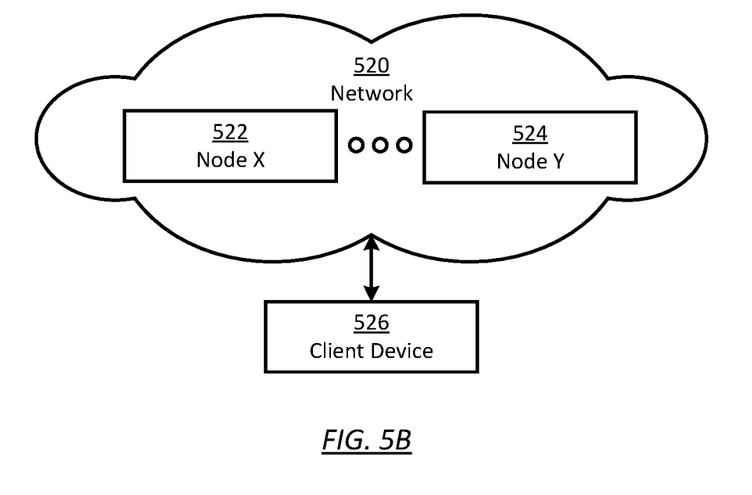

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (500) may be located at a remote location and connected to the other elements over a network.

The nodes (e.g., node X (522), node Y (524)) in the network (520) may be configured to provide services for a client device (526), including receiving requests and transmitting responses to the client device (526). For example, the nodes may be part of a cloud computing system. The client device (526) may be a computing system, such as the computing system shown in FIG. 5A. Further, the client device (526) may include and/or perform all or a portion of one or more embodiments of the invention.

The computing system of FIG. 5A may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a GUI that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be temporary, permanent, or semi-permanent communication channel between two entities.

The various descriptions of the figures may be combined and may include or be included within the features described in the other figures of the application. The various elements, systems, components, and steps shown in the figures may be omitted, repeated, combined, and/or altered as shown from the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, the term "or" is an "inclusive or" and, as such includes the term "and." Further, items joined by the term "or" may include any combination of the items with any number of each item unless, expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:
receiving text data from an application;
processing the text data through the text segmentation model to generate a set of documents, wherein each document corresponds to a segment of the text data;
generating a first vector representation for a first document of the set of documents;
performing a machine learning process that compares the first vector representation and a set of vector representations for a set of documents within a data repository to determine a subset of the documents, wherein determining the subset of documents further comprises determining a model confidence for each document in the subset;
generating a composite rank for each respective document of the subset, wherein generating the composite rank further comprises combining a respective model confidence with a set of user scores for the respective document to generate the composite rank; and
presenting the subset of documents, sorted according to the respective composite ranks.

2. The method of claim 1, further comprising:
indexing the set of documents; and
storing the set of documents in the data repository.

3. The method of claim 2, wherein the set of documents is linked as series of time sequential documents, wherein the link is an array, a linked list, or a doubly linked list.

4. The method of claim 1, wherein determining the subset of documents further comprises:
generating the first vector representation and the set of vector representations in parallel using a Siamese neural network.

5. The method of claim 1, further comprising:
receiving an input of audio data; and
performing a speech-to-text on the audio data to generate the text data.

6. The method of claim 5, further comprising:
receiving the input of the audio data in a data stream; and
performing the text segmentation, subset determination, and composite rank generation over a first time-window of the data stream as the text data is received in real time.

7. The method of claim 6, further comprising:
performing the text segmentation, subset determination, and composite rank generation over a second time-window of the data stream as the text data is received in real time to determine a second subset of the documents; and
presenting a second subset of documents, sorted according to their respective composite ranks.

8. The method of claim 1, further comprising:
receiving a user score for the document; and
updating the set of user scores based on the user score.

9. A system comprising:
a computer processor;
a text segmentation model, executing on the computer processor and configured for:
  receiving text data from an application;
  processing the text data through the text segmentation model to generate a set of documents, wherein each document corresponds to a segment of the text data;
a recommendation model, executing on the computer processor and configured for:
  receiving the set of documents from the text segmentation model;
  processing the set of documents through the recommendation model to generate a first vector representation for a first document of the set of documents;
  processing the first vector representation through the recommendation model to compare the first vector representation with a set of vector representations for a set of documents stored within a data repository; and
  processing the set of vector representations through the recommendation model to determine a subset of the set of documents, wherein determining the subset of documents further comprises determining a model confidence for each document in the subset;
wherein the system is configured for:
  generating a respective composite rank for each document of the subset, wherein generating the composite rank further comprises combining a respective model confidence with a set of user scores for the respective document to generate the composite rank; and
  presenting the subset in an interface, sorted according to the respective composite ranks.

10. The system of claim 9, wherein the system is further configured for:
  indexing the set of documents; and
  storing the set of documents in the data repository.

11. The system of claim 10, wherein the set of documents is linked as series of time sequential documents, wherein the link is an array, a linked list, or a doubly linked list.

12. The system of claim 9, wherein determining the subset of documents further comprises:
  generating the first vector representation and the set of vector representations in parallel using a Siamese neural network.

13. The system of claim 9, wherein the system further comprises a speech recognition engine configured for:
  receiving an input of audio data;
  performing a speech-to-text on the audio data to generate the text data.

14. The system of claim 13, wherein the speech recognition engine is further configured for:
  receiving the input of the audio data in a data stream; and
wherein the system is further configured for:
  performing the text segmentation, subset determination, and composite rank generation over a first time-window of the data stream as the text data is received in real time.

15. The system of claim 14, wherein the system is further configured for:
  performing the text segmentation, subset determination, and composite rank generation over a second time-window of the data stream as the text data is received in real time to determine a second subset of the documents; and
  presenting a second subset of documents, sorted according to their respective composite ranks.

16. The system of claim 9, wherein the system is further configured for:
  receiving a user score for the document; and
  updating the set of user scores based on the user score.

17. A computer program product comprising non-transitory computer-readable program code that, when executed by a computer processor of a computing system, causes the computing system to perform the operations of:
  receiving text data from an application;
  processing the text data through the text segmentation model to generate a set of documents, wherein each document corresponds to a segment of the text data;
  generating a first vector representation for a first document of the set of documents;
  performing a machine learning process that compares the first vector representation and a set of vector representations for a set of documents within a data repository to determine a subset of the documents, wherein determining the subset of documents further comprises determining a model confidence for each document in the subset;
  generating a composite rank for each respective document of the subset, wherein generating the composite rank further comprises combining a respective model confidence with a set of user scores for the respective document to generate the composite rank; and
  presenting the subset of documents, sorted according to the respective composite ranks.

18. The computer program product of claim 17, wherein the computing system performs the operations of:
  indexing the set of documents; and
  storing the set of documents in the data repository, wherein the set of documents is linked as series of time sequential documents, wherein the link is an array, a linked list, or a doubly linked list.

* * * * *